United States Patent [19]

Williamson

[11] 4,340,379
[45] Jul. 20, 1982

[54] REINFORCED CONTAINER FOR BULK MATERIAL

[75] Inventor: Robert R. Williamson, Dallas, Tex.

[73] Assignee: Better Agricultural Goals Corporation, Dallas, Tex.

[21] Appl. No.: 178,715

[22] Filed: Aug. 18, 1980

Related U.S. Application Data

[60] Division of Ser. No. 941,254, Sep. 11, 1978, Pat. No. 4,253,507, which is a continuation-in-part of Ser. No. 460,053, Apr. 11, 1974, Pat. No. 4,113,146.

[51] Int. Cl.³ ..................... B31B 41/00; B31B 39/00
[52] U.S. Cl. ............................... 493/211; 493/217; 493/293; 493/297; 493/308; 493/933; 493/967
[58] Field of Search ............... 493/210, 211, 217, 219, 493/222, 294, 293, 297, 933, 967, 308; 150/1

[56] References Cited

U.S. PATENT DOCUMENTS

| | | | |
|---|---|---|---|
| 733,542 | 7/1903 | Converse | 150/1 |
| 1,335,607 | 3/1920 | Salisbury | 150/1 |
| 2,155,057 | 4/1939 | Moore | 493/111 X |
| 2,301,128 | 11/1942 | Landefeld | 150/1 |
| 2,314,876 | 3/1943 | Greene | 154/40 |
| 2,370,680 | 3/1945 | Moore | 493/217 X |
| 2,969,102 | 1/1961 | Cunningham | 150/0.5 |
| 3,072,512 | 1/1963 | Dalle | 154/46 |
| 3,096,013 | 7/1963 | Kugler | 229/55 |
| 3,282,757 | 11/1966 | Brussee | 156/69 |
| 3,328,226 | 6/1967 | Wiley | 161/92 |
| 3,374,929 | 2/1968 | Silfverskiold | 222/105 |
| 3,423,010 | 1/1969 | Corbett | 229/55 X |
| 3,430,815 | 3/1969 | Weimer | 222/99 |
| 3,490,507 | 1/1970 | Grashorn | 150/1 |
| 3,531,365 | 9/1970 | Melin | 161/89 |
| 3,540,356 | 11/1970 | Lecomte | 493/217 X |
| 3,570,749 | 3/1971 | Sato | 229/55 |
| 3,581,883 | 6/1971 | Whitney | 206/46 |
| 3,589,506 | 6/1971 | Ford | 206/46 |
| 3,596,824 | 8/1971 | Lehmacher | 229/54 |
| 3,607,616 | 9/1971 | Barbehenn | 161/252 |
| 3,620,774 | 11/1971 | Ford et al. | 99/171 C |
| 3,623,937 | 11/1971 | Gasaway | 161/89 |
| 3,666,585 | 5/1972 | Barbehenn | 156/85 |
| 3,701,559 | 10/1972 | Marino | 294/74 |
| 3,742,664 | 7/1973 | Reding | 52/194 |
| 3,754,063 | 8/1973 | Schirmer | 264/22 |
| 3,788,199 | 1/1974 | Sato et al. | 493/217 X |
| 3,789,897 | 2/1974 | Saito | 150/11 |
| 3,798,115 | 3/1974 | Hofmann | 161/227 |
| 3,827,471 | 8/1974 | Gregory | 150/2 |
| 3,865,339 | 2/1975 | Von Alven | 248/318 |
| 3,874,989 | 4/1975 | Stange | 161/190 |
| 3,893,595 | 7/1975 | Khanna | 222/185 |
| 3,961,655 | 6/1976 | Nattrass | 150/1 |
| 3,962,959 | 6/1976 | Williamson | 493/217 |
| 3,982,986 | 9/1976 | Stone | 156/308 |
| 4,174,804 | 11/1979 | Bosse | 493/217 |

FOREIGN PATENT DOCUMENTS

| | | | |
|---|---|---|---|
| 523764 | 4/1931 | Fed. Rep. of Germany | 294/74 |
| 413476 | 12/1966 | Switzerland . | |
| 915999 | of 0000 | United Kingdom | 150/1 |
| 1340693 | 12/1973 | United Kingdom . | |

Primary Examiner—James F. Coan
Attorney, Agent, or Firm—Richards, Harris & Medlock

[57] ABSTRACT

A reinforced receptacle for bulk materials is constructed from a two-ply plastic tube having a reinforced sheet wrapped and overlapped about the two-ply plastic tube. The reinforced sheet is adhesively secured to the two-ply tube, and the lower end of the two-ply tube is folded and adhesively secured together to form a folded satchel bottom for the receptacle. The upper end of the two-ply tube is gathered and clamped to provide structure for lifting the receptacle.

4 Claims, 15 Drawing Figures

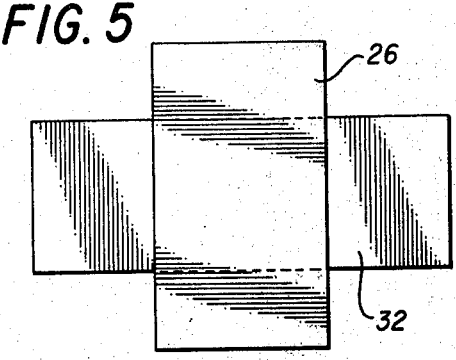
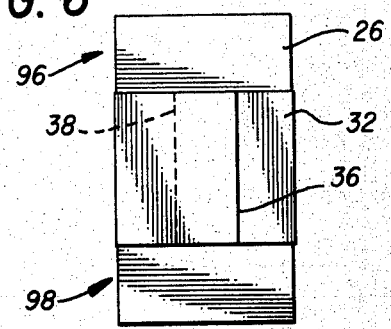
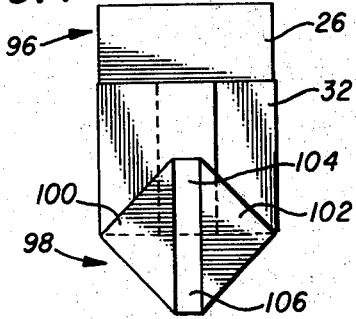
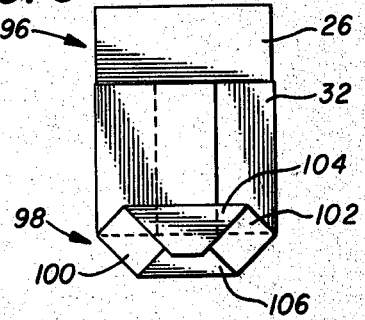
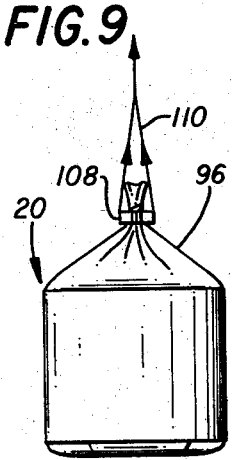
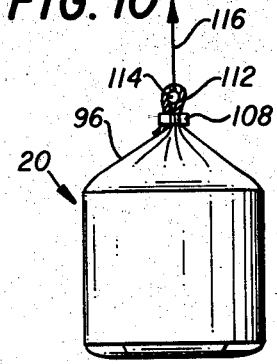
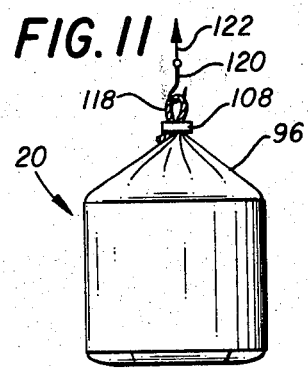
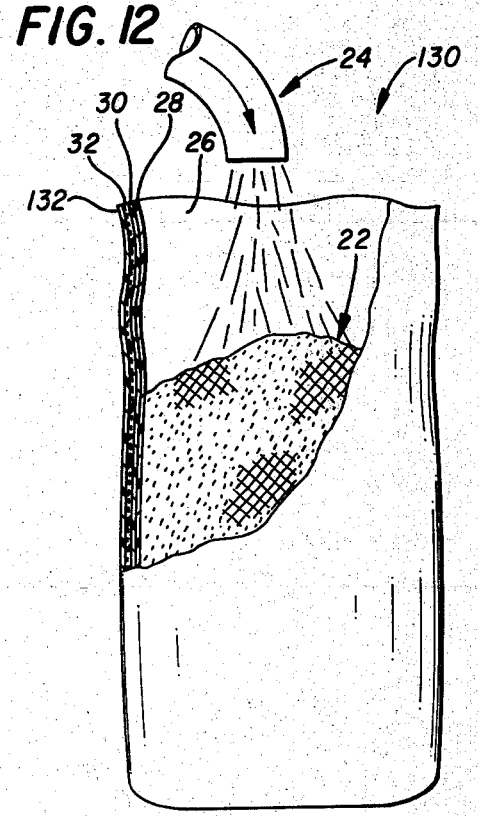

REINFORCED CONTAINER FOR BULK MATERIAL

REFERENCE TO RELATED APPLICATION

This is a division of application Ser. No. 941,254 filed Sept. 11, 1978, now U.S. Pat. No. 4,253,507, which is a continuation-in-part of an application filed on Apr. 11, 1974, Ser. No. 460,053 and entitled "Disposable Container for Bulk Materials" that is now U.S. Pat. No. 4,113,146.

BACKGROUND AND SUMMARY OF THE INVENTION

The present invention relates to containers and the manufacture thereof and, more particularly, relates to an improved flexible container for bulk materials and an improved method of manufacturing the same.

The prior art includes systems of handling bulk materials utilizing a flexible receptacle having a large capacity. Such receptacles have, in the past, utilized an outer protective covering of flexible sheet material which can be doubled for additional strength. In one known receptacle, a double walled interior bag is provided, and a high strength filament is wound in a helix about the exterior surface of the double walled bag. A non-curing mastic adhesive is used to secure the filament to the double walled bag, and a sling of flexible webbing is used to support the receptacle. The bottom of the bag is formed by gathering and tying the bag to close one end, and a sling is used to support the bag which includes a plurality of concentric rings positioned below and supporting the receptacle. Straps connect the concentric rings and are used to lift and support the receptacle.

A method for manufacturing such a flexible receptacle is disclosed in U.S. Pat. No. 3,692,959; filed Dec. 16, 1974; and issued June 15, 1976; whereby one edge of a length of flexible sheet material is affixed to a mandrel, and the mandrel is rotated to wrap the sheet material about the mandrel. An adhesive is applied to the exterior of the sheet material, and the material is rotated to wrap a second sheet of material about the mandrel to form a second cylindrical wall. One end of the double walled cylinder, thus formed, is gathered and tied to form a closed end. An adhesive material is then applied to the exterior wall of the double walled cylinder, and a filament is wound in a helix about the second wall. A sling is positioned over the helically wound filament, and an outer cover sheet is adhesively attached around the exterior of the sling and the helically wound filament. Although such receptacles and methods for making the same have been quite adequate, they typically have required substantial amounts of labor in manufacturing. Manufacturing techniques were often slow and required hand labor. Therefore, according to one feature of the present invention, an improved method for making a receptacle results in faster and easier production, as well as providing a relatively inexpensive flexible receptacle for bulk materials of outstanding quality.

In accordance with the present invention, a reinforced receptacle for containing bulk materials includes a coextruded plastic multiple-ply tube having at least an inner and an outer ply and having an upper and a lower end. A reinforced sheet is wrapped around the multiple-ply tube and encompasses the tube from the lower end to the height to which the receptacle is filled with bulk materials. The reinforcing sheet includes a plurality of reinforcing filaments disposed circumferentially about and reinforcing the multiple-ply tube to prevent bursting and tearing of the multiple-ply tube when filled with bulk materials. The reinforcing sheet also includes a leading edge and a following edge with the leading edge overlapping and adhesively secured to the following edge to form a closed reinforcing belt or cylinder about the multiple-ply tube.

The lower end of the multiple-ply cylinder is folded and adhesively secured together to form a closed lower end, and the upper end of the multiple-ply tube extends above the reinforced sheet and above the bulk materials contained within the receptacle for a sufficient distance, so that the upper end may be gathered, clamped and used to lift the reinforced receptacle.

The folded bottom of the multiple-ply tube is folded to form a satchel bottom in the receptacle. Opposing lateral sides of the bottom end of the receptacle are folded inwardly, one towards the other. Then, the remaining front and rear opposing sides are folded inwardly, one towards the other, in a direction perpendicular to the fold direction of the first lateral opposing sides. Glue is applied along the overlapping surfaces of the folded material to adhesively secure the bottom of the multiple-ply tube in the folded satchel configuration.

In the preferred method of manufacturing the reinforced receptacle for bulk material, a plastic multiple-ply tube is coextruded and positioned in a flat position to form a flat collapsed tube. Two plastic sheets are formed having a length exceeding the circumference of the multiple-ply tube by a specified amount, and a plurality of substantially parallel filaments are positioned between the two plastic sheets extending along the length of the sheets. The two plastic sheets are adhesively secured together with the parallel filaments adhesively secured between the sheets forming a multiple-ply reinforced sheet. An adhesive is applied to the mid-region of the multiple-ply tube, and the reinforced sheet is wrapped and adhesively secured about the midregion of the flat, collapsed, multiple-ply tube with the filaments disposed concentrically and leaving an upper and lower portion of the multiple-ply tube extending beyond the reinforced sheet. A leading edge of the reinforced sheet is overlapped and adhesively secured to the trailing edge of the reinforced sheet to form a closed reinforcing collapsed cylinder about the flat tube.

The lower portion of the multiple-ply tube extending beyond the reinforced sheet is folded and glued together to form a folded satchel bottom on the receptacle. Folding and adhesively securing together one end of the multiple-ply tube eliminates the knot of material formed when the end of a receptacle is gathered and tied, as well as providing a reliable, inexpensive means of closing one end of the receptacle.

When the reinforced receptacle is filled with bulk materials, the upper portion of the multiple-ply tube is gathered and clamped by a clamp means that uniformly distributes the clamping force on the upper portion. A lifting force applied through the clamp means is uniformly distributed about the circumference of the multiple-ply tube to lift without tearing the receptacle.

In accordance with another embodiment of the present invention, a reinforced polyethylene two-ply receptacle is manufactured by coextruding a polyethylene two-ply cylinder having inner and outer cylindrical walls. The two-ply cylinder is positioned on a mandrel leaving a portion of the two-ply cylinder having a length greater than the radius of the mandrel overhanging the end of the mandrel. This overhanging portion of the two-ply cylinder is folded and adhesively secured together to form a satchel bottom to close one end of the two-ply cylinder. The mandrel is rotated, and a mastic is applied to the exterior of the two-ply cylinder. A reinforcing sheet having concentrically disposed filaments is wrapped about the two-ply cylinder. The trailing edge of the reinforcing sheet is overlapped and adhesively secured to the leading edge of the polyester sheet. While the mandrel is again rotated, mastic material is applied to the exterior of the reinforcing sheet, and a cover sheet of polyethylene is wrapped about the reinforcing sheet to prevent damage by abrasion. The two-ply cylinder is then removed from the mandrel.

BRIEF DESCRIPTION OF THE DRAWINGS

The advantages of the present invention may be best appreciated by those of ordinary skill in the art by reference to the following Detailed Description in conjunction with the Drawings in which:

FIG. 5 shows a flat, collapsed, two-ply plastic tube with the reinforced sheet positioned adjacent the midregion of the tube;

FIG. 6 shows the reinforced sheet wrapped and overlapped about the two-ply tube;

FIG. 7 shows an intermediate step in folding the lower end of the two-ply tube to form a closed bottom for the two-ply receptacle;

FIG. 8 shows the completed folding of the lower end of the two-ply tube to form a folded satchel bottom for the receptacle;

FIG. 9 shows a completed receptacle having its upper end gathered and secured together by a bar clamp with cables extending from the bar clamp for lifting the receptacle;

FIG. 10 discloses a receptacle having its upper end gathered, turned back on itself, and clamped by a clamp to form a loop for lifting the receptacle;

FIG. 11 shows a receptacle having its upper end gathered and looped for receiving a hook for lifting the receptacle;

FIG. 12 shows an alternate embodiment of the present invention in which the reinforced sheet and a cover sheet extend to the upper end of the two-ply tube;

DETAILED DESCRIPTION OF THE DRAWINGS

Figure 1:
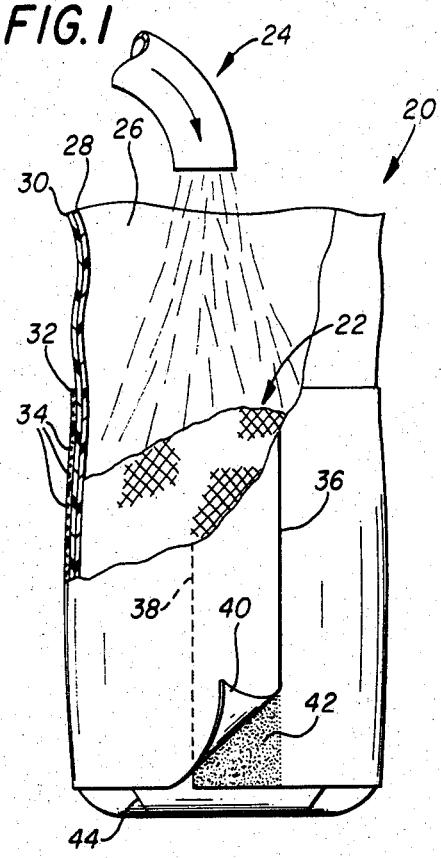
FIG. 1 shows a receptacle embodying the present invention for containing flowable bulk materials.

Referring now to the Drawings in which like reference characters designate like or corresponding parts throughout the several views, there is shown in FIG. 1 a receptacle 20 embodying the present invention. This application is a continuation-in-part of co-pending application Ser. No. 460,053, now U.S. Pat. No. 4,113,146, the disclosure of which is herein incorporated by reference. The receptacle 20 is dimensioned for containing flowable bulk materials 22 that may be introduced into the receptacle by conveying structures such as nozzle 24.

In the preferred embodiment, the interior of receptacle 20 is formed by a coextruded plastic tube 26 that includes an inner-ply 28 and an outer-ply 30. Typically, the coextruded tube 26 is constructed from polyethylene or polybutylene. A reinforcing sheet 32 extends from the bottom of the receptacle 20 towards the top of the receptacle to the approximate fill height of the flowable bulk materials 22 in the receptacle. The reinforcing sheet 32 includes reinforcing filaments 34 disposed concentrically about the receptacle 20 for providing additional strength to resist bulging and bursting of the receptacle 20.

The leading edge 36 of the reinforcing sheet 32 overlaps the trailing edge 38 of the reinforcing sheet and is secured thereto by an adhesive. The lower corner 40 of the reinforcing sheet 32 is shown pulled back from the receptacle 20 to reveal the overlap portion 42 that is coated with an adhesive for securing together the leading edge 36 and the trailing edge 38 of the reinforcing sheet 32. Overlap portion 42 is dimensioned sufficiently large to provide the required strength to resist pulling apart when the receptacle 20 is filled with flowable bulk materials 22. Thus, the size of overlap portion 42 is determined by the load parameters for which receptacle 20 is designed and by the adhering strength of the adhesive used on the overlap portion 42. The bottom 44 of the receptacle 20 is folded and adhesively secured together to form a closed end as will be hereinafter described in greater detail.

Figure 2:
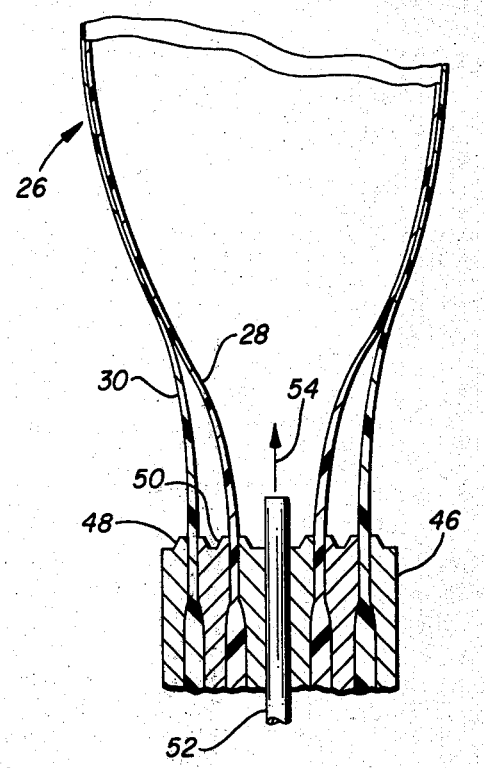
FIG. 2 diagrammatically illustrates coextrusion of a two-ply plastic tube used in constructing the receptacle of the present invention.

Referring now to FIG. 2, there is diagrammatically shown the coextrusion of the two-ply tube 26. A die 46 includes an outer annular nozzle 48 and an inner annular nozzle 50 through which an extrudable plastic such as polyethylene or polybutylene is extruded to form an inner tubular-ply 28 and an outer tubular-ply 30. A tube 52 extends through the die 46 into the enclosed area within the inner-ply 28 of the two-ply tube 26. As the tube 26 is extruded, air is forced into the interior of the tube as generally indicated by arrow 54. The air pressure created within the tube 26 causes it to uniformly expand to the desired circumference. By regulating the thickness of plys 28 and 30 as they are extruded from nozzles 48 and 50, and by regulating the air pressure created by forcing air through the tube 52, the circumference and the thickness of the tube 26 may be controlled. In the preferred embodiment, tube 26 is approximately 44 inches in diameter and has a thickness of approximately 8 mils.

Figure 3:
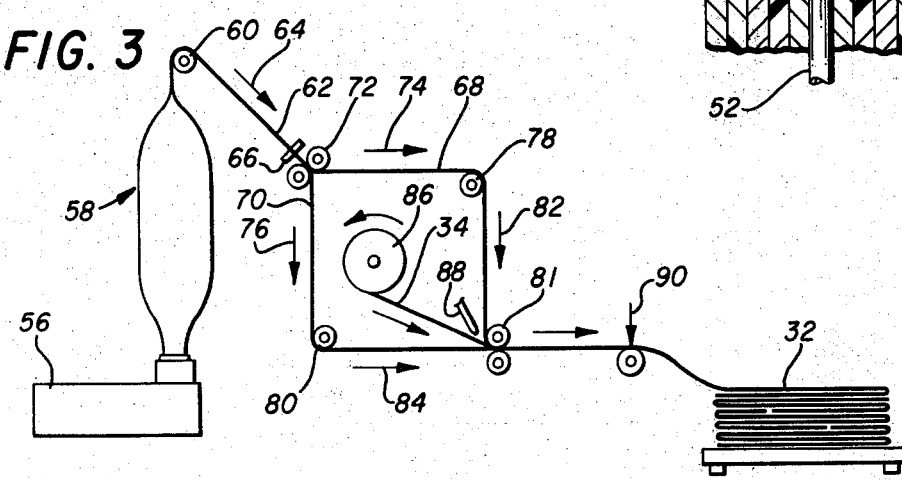
FIG. 3 diagrammatically discloses the method of constructing a reinforced sheet used in constructing the receptacle.

Referring now to FIG. 3, there is shown a diagrammatical representation of the method for manufacturing the reinforcing sheets 32. An extruder 56 is used to extrude a single-ply, plastic film tube 58 that is flattened around a roller 60 to form a flat, collapsed tube 62. A constant air pressure is maintained within tube 58 to control the circumference of the tube 58. By controlling the circumference of tube 58, the width of the collapsed tube 62 is determined.

The collapsed tube 62 moves in the direction indicated by arrow 64 through a slitter 66 that cuts the tube 62 along its outer edges to form two plastic sheets 68 and 70. After passing through rollers 72, the sheets 68 and 70 are separated and are directed, respectively, in the directions indicated by arrows 74 and 76. Sheets 68 and 70 travel around guide rollers 78 and 80 and then travel in the direction indicated by arrows 82 and 84 to be reunited between the roller pair 81.

A spool 86 containing a plurality of filaments 34 is disposed for rotation to allow the insertion of the filaments 34 between the plastic sheets 68 and 70. As the sheets 68 and 70 pass between the roller pair 81, the filaments 34 are inserted between the sheets, and an adhesive is applied to the filaments 34 and between the sheets 68 and 70 by a structure, such as a nozzle 88. In this manner, the sheets 68 and 70 are adhesively secured together, and the filaments 34 are adhesively secured between and to the sheets 68 and 70. The laminated sheets 68 and 70 then pass through a cutter 90 that cuts the laminated sheets 68 and 70 and the filaments 34 into individual reinforcing sheets 32.

Figure 4:
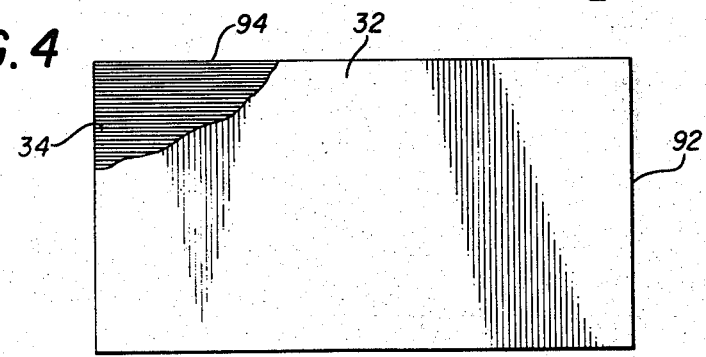
FIG. 4 shows a detailed view of the reinforced sheet.

Referring now to FIG. 4, a completed reinforcing sheet 32 is shown partially broken away to reveal filaments 34. The width 92 of the reinforcing sheet 32 is equal to or greater than the fill height of the flowable bulk materials 22 as shown in FIG. 1. The length 94 of the reinforcing sheet 32 is equal to the circumference of the receptacle 20 plus the additional distance of the overlap portion 42 as shown in FIG. 1. The reinforcing filaments 34 extend along the entire length 94 of the reinforcing sheet 32 and are typically constructed from a monofilament polyester. However, it will be understood that a large number of filament materials may be used in the present invention for providing additional tensile strength for the reinforcing sheet 32.

Referring now to FIG. 5, there is shown the two-ply tube 26 in a collapsed flat position with the reinforcing sheet 32 disposed beneath and adjacent the midregion of the tube 26. An adhesive is applied between the reinforcing sheet 32 and the tube 26 to secure the reinforcing sheet thereto.

Referring now to FIG. 6, there is shown the tube 26 with the reinforcing sheet 32 wrapped and overlapped about the tube 26. An adhesive secures the reinforcing sheet 32 to the tube 26, and also the leading edge 36 is secured to the trailing edge 38 of the reinforcing sheet by an adhesive as also shown in FIG. 1. At this step in construction, both the tube 26 and the reinforcing sheet 32 are collapsed in a flat position, and the upper end 96 and the lower end 98 of tube 26 extend beyond the reinforcing sheet 32. If it is desired to make the receptacle 20 cylindrical, the upper end 96 and the lower end 98 should extend beyond the reinforcing sheet for a distance exceeding the radius of the receptacle 20.

Referring now to FIG. 7, the lateral sidewalls 100 and 102 of the lower tube end 98 have been folded inwardly towards one another. The lateral sidewalls 100 and 102 have a generally triangular folded configuration and leave a front wall portion 104 and a rear wall portion 106.

Referring now to FIG. 8, the rear wall portion 106 of the lower tube end 98 has been folded inwardly, and the front wall portion 104 has been folded inwardly to overlap the rear wall portion 106 to form a folded satchel bottom. As the lower tube end 98 is folded, as shown in FIGS. 7 and 8, the overlapping portions of the lower tube end 98 are adhesively secured together. Thus, when the folding steps are completed as shown in FIG. 8, the folded satchel bottom is adhesively secured in the folded position. It has been found that the folded and adhesively secured together satchel bottom provides a reliable and inexpensive closed end or bottom for the receptacle 20.

Referring now to FIG. 9, there is shown a completed receptacle 20 in which the upper tube end 96 has been gathered together and clamped by a bar clamp 108. The finished receptacle 20 will normally be handled on a pallet until it is to be emptied. The bar clamp 108 is used to uniformly clamp the gathered upper tube end 96, and an upward lifting force may be applied to the bar clamp through the cables 110. The upward lifting force is distributed evenly about the circumference of tube 26. In this manner, the receptacle 20 may be lifted without tearing and moved to a position for emptying.

Referring now to FIGS. 10 and 11, alternate structure is shown for lifting the receptacle 20. In FIG. 10, the upper tube end 96 is gathered, folded back on itself and clamped by a bar clamp 108 to form a loop portion 112. A bar 114 is inserted through the loop portion 112, and cables 116 apply a lifting force to the bar 114. In FIG. 11, the upper tube end 96 is gathered, twisted into a rope, folded back on itself and clamped by clamp 108 to form a twisted, ropelike loop 118. A hook 120 is inserted through the loop 118, and an upward lifting force is applied to the hook through a cable 122.

It will be understood that any lifting device may be used that will clamp the material firmly without cutting and that will evenly distribute the load throughout the perimeter of the receptacle 20. The thickness of the upper tube end 96, which is a part of the two-ply plastic tube 26, must be chosen in view of the size of the receptacle 20 and the load for which it is designed. For instance, if a receptacle 20 is designed to carry an approximate load of 2,000 pounds having a 44 inch diameter with a loading of 14.5 pounds per inch of circumference, theoretically, this weight can be handled by a two-ply plastic tube 26 constructed from polybutylene having a thickness of 6½ mils. Therefore, an 8 mil bag should have a 28% margin of safety over the yield strength of the tube 26 when used with the load for which the bag was designed. The dimensions of the receptacle 20 necessary for different loads may be determined by conventional design techniques taking into consideration the weight and density of the bulk material load, the size of the receptacle 20 and the strength of the materials used to construct the receptacle 20.

Referring now to FIG. 12, there is shown a receptacle 130 representing an alternate embodiment of the present invention. Receptacle 130 includes a two-ply coextruded plastic tube 26 having an inner-ply 28 and an outer-ply 30 of a construction similar to the receptacle 20 shown in FIG. 1. A reinforcing sheet 32 is wrapped about the tube 26 and extends to the upper end of tube 26. Also, a cover sheet 132 is wrapped about the reinforcing sheet 32 to form the outer layer of receptacle 130.

The receptacle 130 may be used in the same manner as receptacle 20. However, since the reinforcing sheet 32 and the cover sheet 132 extend to the top of the receptacle 130, it is acceptable to completely fill receptacle 130 with flowable bulk materials 22. Thus, receptacle 130 may be used for storing bulk materials when there is no necessity to cover the bulk materials, and there is no need to lift the receptacle 130 by the methods shown in FIGS. 9-11.

Figure 13:
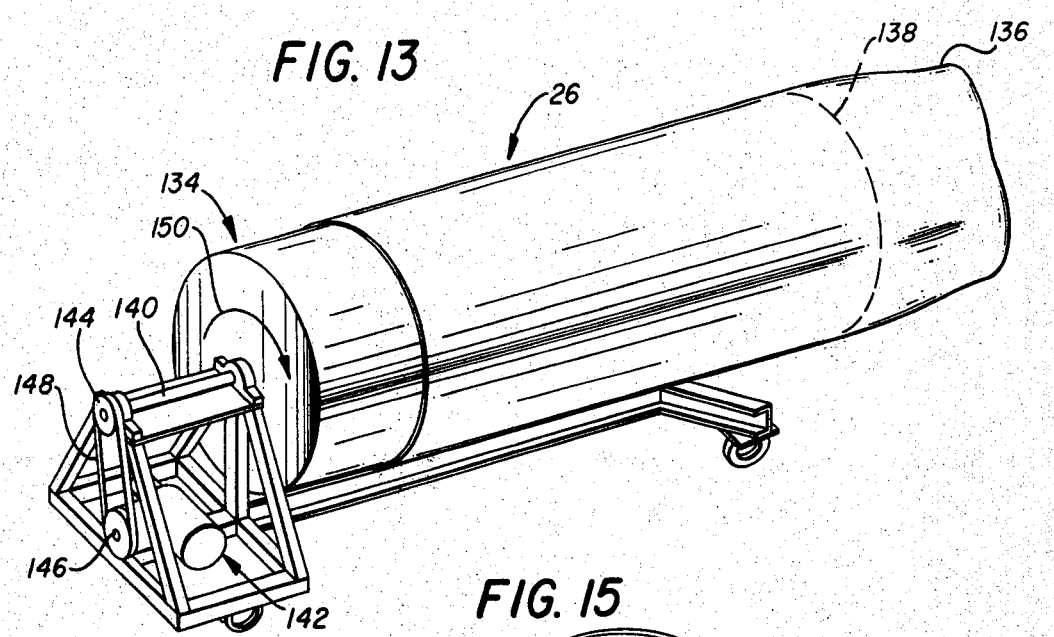
FIG. 13 discloses a two-ply tube disposed on a mandrel for manufacturing a receptacle in accordance with an alternate method of the present invention.

Referring now to FIG. 13, there is shown an alternate method for constructing either receptacle 20 shown in FIG. 1 or receptacle 130 shown in FIG. 12. It will be understood that either receptacle 20 or receptacle 130 may also be constructed in the previously described preferred method. In this alternate method, the two-ply plastic tube 26 is fitted over a mandrel 134 leaving an overhanging portion 136 of the tube 26 extending beyond the end 138 of the mandrel. The mandrel 134 is mounted on a shaft 140 which is connected to an electric motor 142 through pulleys 144 and 146, and belt 148. In this construction, the motor 142 may be energized to rotate the mandrel 134 in the direction indicated by arrow 150.

Figure 14:
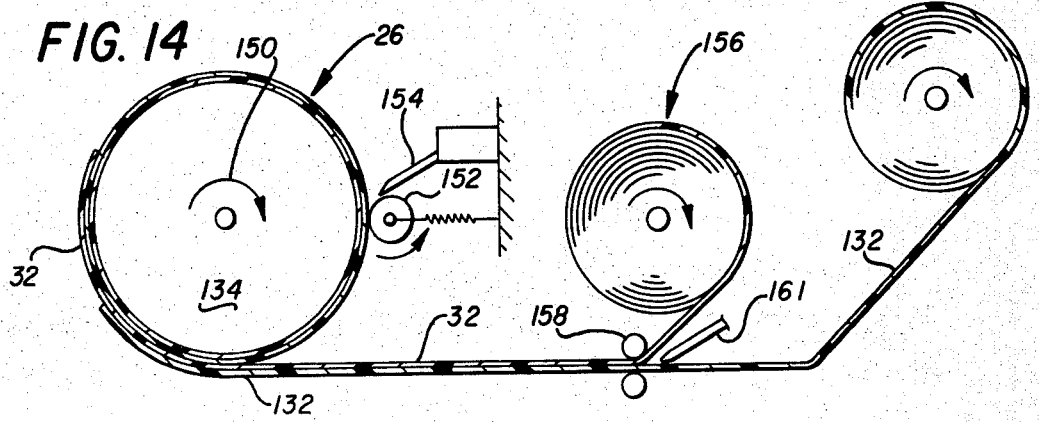
FIG. 14 diagrammatically shows the mandrel being used to wrap a reinforcing sheet and a cover sheet about the two-ply tube.

Referring now to FIG. 14, there is diagrammatically shown an alternate method of constructing either receptacle 20 or receptacle 130 shown in FIGS. 1 and 12, respectively. An end view of mandrel 134 is shown with the two-ply plastic tube 26 mounted thereon. A roller 152 is spring biased towards the mandrel 134, and a nozzle 154 applies an adhesive between the roller 152 and the mandrel 134. As the mandrel 134 is rotated in the direction indicated by arrow 150, the adhesive from nozzle 154 is applied to the exterior of plastic tube 26 and is spread evenly by the roller 152.

After an adhesive has been applied to a portion of the exterior of tube 22, a reinforcing sheet 32 such as described in conjunction with FIGS. 3 and 4 is wrapped about the plastic tube 26 as the mandrel 134 rotates. The reinforcing sheet 32 is fed from a rotatable spool 156 of reinforcing sheet material. As the reinforcing sheet 32 travels towards the mandrel 134 from the spool 156, the reinforcing sheet 32 passes between a roller pair 158. The cover sheet 132 is fed from a spool 160 and also passes between the roller pair 158 and is positioned on the outside of the cover sheet 132. An adhesive is applied between the cover sheet 132 and the reinforcing sheet 32 by a nozzle 161, and the adhesive is spread evenly by the roller pair 158. In this manner, the reinforcing sheet 32 and the cover sheet 132 form a laminate construction. The leading edge of the reinforcing sheet 32 is started on its wrap around tube 26 ahead of the leading edge of the cover sheet 132. The reinforcing sheet is then cut in a length sufficient to overlap itself, and the cover sheet 132 is also cut in the length sufficient to overlap itself. In this manner, the leading edge of the reinforcing sheet 32 is directly adhered to the trailing edge of the reinforcing sheet resulting in an efficient and strong structure. If desired, the reinforcing sheet 32 may be compeletly wrapped and overlapped about plastic tube 26 before the cover sheet 132 is wrapped about the reinforcing sheet 32.

Optionally, spool 160 and cover sheet 132 shown in FIG. 14 may be omitted to produce the receptacle 20 shown in FIG. 1. Also, it will be understood that filaments 34 described in conjunction with FIGS. 3 and 4 may be loaded on spool 156 to apply the reinforcing filaments directly to the tube 26. Any number of ply of reinforcing filaments 34 and plastic sheets such as sheet 132 may be wrapped around mandrel 134 to produce a wide variety of multiple-ply receptacles.

Figure 15:
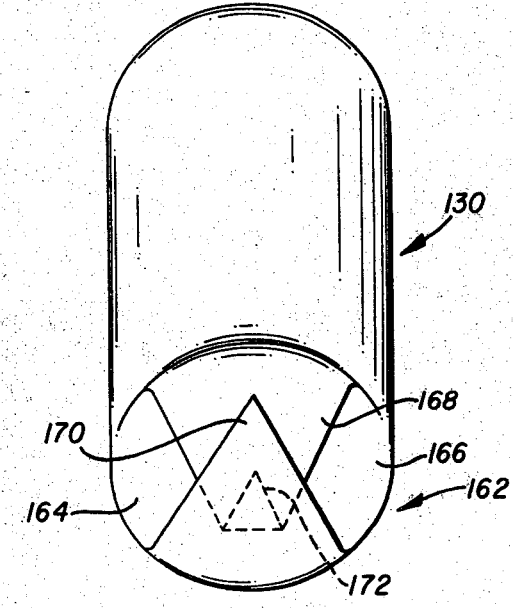
FIG. 15 shows the folded satchel bottom of a receptacle representing an alternate embodiment of the present invention.

FIG. 15, shows a perspective view of the receptacle 130 showing the folded bottom 162 which is folded in a satchel configuration substantially as described above with respect to FIGS. 7 and 8. Referring to FIGS. 13 and 15, the overhanging portion 136 of the plastic tube 26 is folded while the tube 26 is on the mandrel 134. Lateral portions 164 and 166 of the overhanging portion 136 are first folded inwardly. Next, an upper portion 168 is folded downwardly and a lower portion 170 is folded upwardly. As the lower portion 170 is folded upwardly, a triangular tab 172 of upper portion 168 is folded back on itself. During the folding process, an adhesive is applied to all overlapping areas of the overhanging portion 136 to adhesively secure the bottom 162 in the folded configuration.

The present invention provides an inexpensive receptacle having adequate reinforcement and strength to handle flowable bulk materials and includes improved constructions for closing the lower end of the receptacle and for lifting the receptacle.

Although particular embodiments of the present invention have been described in the foregoing Detailed Description, it will be understood that the present invention is capable of numerous modifications, rearrangements and substitutions of parts without departing from the scope of the invention.

What is claimed is:

1. A method of forming a reinforced receptacle comprising the steps of:
    coextruding a plastic multiple-ply cylinder having at least inner and outer cylinder walls;
    positioning the multiple-ply cylinder on a mandrel;
    folding and adhesively securing together one end of the inner and outer cylinder walls to close one end of the multiple-ply cylinder;
    rotating the mandrel and applying an adhesive to the exterior of the multiple-ply cylinder;
    wrapping and securing at least one sheet of reinforcing material about the exterior of the multiple-ply cylinder to form a reinforced receptacle; and
    securing a cover sheet about the reinforcing material.

2. A method of manufacturing a reinforced receptacle for bulk materials comprising the steps of:
    forming a plastic multiple-ply tube having a predetermined circumference;
    forming two plastic sheets having a length greater than the circumference of the multiple-ply tube;
    positioning a plurality of substantially parellel filaments between and extending along the length of the two plastic sheets;
    adhesively securing the two plastic sheets together with the parallel filaments adhesively secured between the two plastic sheets, thereby forming a reinforcing sheet;
    wrapping and adhesively securing the reinforcing sheet about the midregion of the multiple-ply tube leaving one end of the multiple-ply tube overhanging the reinforced sheet; and
    folding and adhesively securing together the overhanging portion of said one end of the multiple-ply cylinder to form a closed, folded, satchel bottom.

3. A method of manufacturing a reinforced receptacle for containing about 2,000 pounds of bulk materials, comprising the steps of:
    coextruding a multiple-ply tube of plastic material having a thickness of at least 6.5 mils;
    positioning the multiple-ply tube in a flat position forming a flat collapsed tube;
    forming two plastic sheets having a length exceeding the circumference of the multiple-ply tube by a specified distance;
    positioning a plurality of substantially parallel filaments between and extending along the length of the two plastic sheets;
    adhesively securing the two plastic sheets together and adhesively securing the parallel filaments between the two plastic sheets forming a reinforcing sheet;

applying an adhesive to the midregion of the multiple-ply tube;

wrapping and adhesively securing the reinforced sheet about the midregion of the flat collapsed multiple-ply tube disposing the filaments concentrically in a direction perpendicular to the tube and leaving an upper and a lower portion of the multiple-ply tube overhanging the reinforced sheet;

overlapping and adhesively securing a leading edge and a following edge of the reinforced sheet forming an overlap portion corresponding to the specified distance to form a closed reinforced cylinder; and folding and adhesively securing the lower portion of the multiple-ply tube together forming a closed, folded, satchel bottom on the receptacle.

4. A method of manufacturing a reinforced plastic two-ply receptacle comprising the steps of:

coextruding a plastic two-ply cylinder having inner and outer cylinder walls;

positioning the two-ply cylinder on a mandrel leaving an overhanging portion of the two-ply cylinder having a length greater than the radius of the mandrel and overhanging the end of the mandrel;

folding and adhesively securing together the overhanging portion of the the two-ply cylinder to form a satchel bottom and thereby close one end of the two-ply cylinder;

rotating the mandrel and applying a mastic adhesive to the exterior of the two-ply cylinder;

forming two plastic sheets having a length greater than the circumference of the multiple-ply tube;

positioning a plurality of substantially parallel filaments between and extending along the length of the two plastic sheets;

adhesively securing the two plastic sheets together with the parallel filaments adhesively secured between the two plastic sheets, thereby forming a reinforcing sheet;

rotating the mandrel and wrapping the sheet of reinforcing material about the two-ply cylinder with the filaments concentrically disposed about the two-ply cylinder;

overlapping and adhesively securing the trailing edge of the reinforcing material over the leading edge of the reinforcing material to form a reinforcing cylinder about the two-ply cylinder;

rotating the mandrel and applying a mastic adhesive to the exterior of the reinforcing cylinder;

rotating the mandrel and wrapping a cover sheet about the reinforcing cylinder;

positioning a sling over the cover sheet with portions of the sling supporting the folded, closed end of the two-ply cylinder, and support straps of the sling extending along the cover sheet; and removing the two-ply cylinder from the mandrel.

* * * * *

UNITED STATES PATENT AND TRADEMARK OFFICE
CERTIFICATE OF CORRECTION

PATENT NO. : 4,340,379
DATED : July 20, 1982
INVENTOR(S) : Robert R. Williamson

It is certified that error appears in the above—identified patent and that said Letters Patent is hereby corrected as shown below:

Column 1, line 36, "3,692,959" should be --3,962,959--;

Column 1, line 41, "material is rotated" should be --mandrel is rotated--.

Signed and Sealed this

Fifth Day of October 1982

[SEAL]

Attest:

Attesting Officer

GERALD J. MOSSINGHOFF

Commissioner of Patents and Trademarks